A. Arnold.
Tea & Coffee Pot.
Nº 71837.  Patented Dec. 10, 1867.
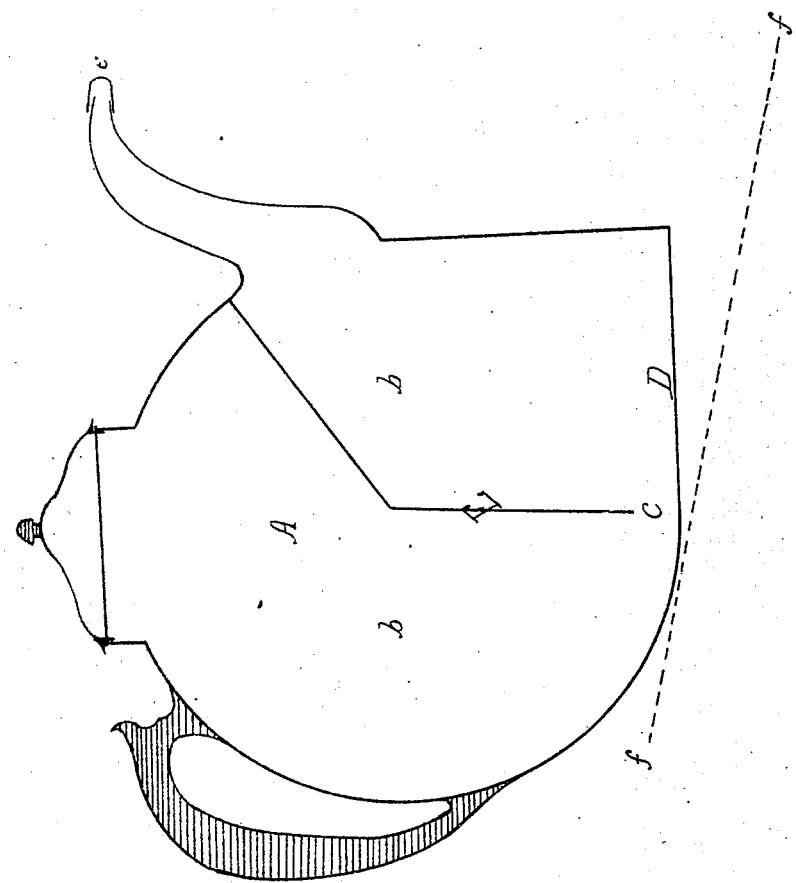
Witnesses
Henry Stanton
Joseph Smith
Alfred Arnold.

UNITED STATES PATENT OFFICE.

ALFRED ARNOLD, OF TENAFLY, NEW JERSEY.

IMPROVED TEA AND COFFEE POT.

Specification forming part of Letters Patent No. 71,837, dated December 10, 1867.

*To all whom it may concern:*

Be it known that I, ALFRED ARNOLD, of Tenafly, Bergen county, State of New Jersey, have invented a new and useful Improvement in Tea and Coffee Pots, of which the following is a full and exact description.

I am aware that automatic mechanism has been employed for removing the heat from coffee-decoctors to prevent excessive boiling; but my invention consists in a novel arrangement and combination of parts in such tea or coffee pots as are boiled by contact with the hot surface of a range or stove, so that the pot itself, without other device, will alternate its heating-surface to and from contact with the range or stove on which it stands in such manner as to prevent boiling over, and also to prevent the escape of steam and aroma.

The accompanying drawing, making a part of this specification, is a vertical section of my improved pot, in which—

A is the body of the pot, and may be made of any form compatible with the requirements hereinafter specified. It is composed of two chambers, $b$ $b'$, which communicate with each other at the point C. The chambers $b$ $b'$ may be of any suitable form; but I prefer the arrangement shown, which consists of the division of A into two compartments by the partition or diaphragm E. D is the base or heating-surface of the pot.

In its operation the pot is placed on the hot range or stove, and as the center of gravity of its contents falls just within $b$, it stands on the heating-surface D. When the water boils, (the end of the spout being closed by the thimble $e$,) steam displaces the water in $b$, forcing it into $b'$, until the center of gravity of the contents of A falls without the base D; then A, changing its position, rests on a point of its periphery near C, and D recedes at an angle from the hot surface of the range, as shown by the dotted lines, until boiling ceases. Then, should the steam in $b$ condense, its place is again supplied with water from $b'$ until the center of gravity again falls within the base and D again resumes contact with the hot surface of the range or stove.

What I claim as my invention is—

1. In a tea or coffee boiler, the base D, so constructed and adapted relatively to the other parts that an oscillating motion will be imparted to the vessel by process of ebullition, substantially as shown and described.

2. I claim, in combination with the base or heating-surface D, the chambers $b$ $b'$ and diaphragm E, or their equivalents, substantially as arranged and described, and for the purposes shown.

ALFRED ARNOLD.

Witnesses:
HENRY STANTON,
JOSEPH SMITH.